United States Patent Office

Patented Feb. 28, 1961

2,973,354

N-SUBSTITUTED MORPHANTHRIDINE COMPOUNDS

Lincoln Harvey Werner, Summit, N.J., assignor to Ciba Pharmaceutical Products, Inc., Summit, N.J., a corporation of New Jersey No Drawing. Filed Oct. 29, 1958, Ser. No. 770,273

11 Claims. (Cl. 260—239)

The present invention relates to morphanthridine-type compounds. More particularly, it concerns 5-tertiary amino-lower alkyl-morphanthridine-6,11-diones and 5-tertiary amino-lower alkyl-morphanthridine-6-ones, their salts or quarternary ammonium compounds, as well as process for the preparation of such compounds.

The lower alkyl portion in a tertiary amino-lower alkyl group is represented by a lower alkylene radical containing from two to seven carbon atoms; such radicals are, for example, 1,2-ethylene, 1-methyl-1,2-ethylene, 2-methyl-1,2-ethylene, 1,3-propylene, 1,4-butylene, 1-methyl-1,4-butylene or similar radicals.

The tertiary amino group of a tertiary amino-lower alkyl radical is more especially an N,N-di-lower hydrocarbon-amino or an N,N-lower alkylene-imino group. Lower hydrocarbon radicals contain from 1 to 7 carbon atoms and are represented by lower alkyl, e.g. methyl, ethyl, propyl, isopropyl or butyl; lower alkenyl, e.g. allyl or methallyl; aryl, e.g. phenyl; or aralkyl, e.g. benzyl. Lower alkylene radicals in the N,N-lower alkylene-imino groups contain from 4 to 6 carbon atoms, which may be arranged in a carbon chain, or such carbon chain may be interrupted by a heteroatom such as oxygen, nitrogen and sulfur, thus form an oxa-, aza- or thia-lower alkylene radical; the N,N-lower alkylene-imino radicals are therefore represented by a pyrrolidino group, e.g. pyrrolidino or 2-methyl-pyrrolidino; a piperidino group, e.g. piperidino, 2-methyl-piperidino, 3-methyl-piperidino, 4-methyl-piperidino, 3-hydroxymethyl-piperidino, 4-(2-dimethylaminoethyl)-piperidino or 1,2,3,4-tetrahydro-1-quinolino; a hexamethylene-imino group; a morpholino group; a thiamorpholino group; or a piperazino group, e.g. 4-methyl-piperazino, 4-(2-hydroxyethyl)-piperazino or 4-(2-acetoxyethyl)-piperazino.

The two benzene rings condensed to the b- and the e-bond of the seven-membered nucleus, respectively, may be unsubstituted or may carry as substituents lower alkyl or halogen. Lower alkyl groups are, for example, methyl, ethyl, isopropyl or tertiary butyl, which substituents may contain additional groups such as halogen atoms, e.g. fluorine, chlorine or bromine, and form, for example, trifluoromethyl groups; halogen atoms are, for example, fluorine, chlorine or bromine. Other substituents are lower alkoxy, which are represented by methoxy or ethoxy or, also, by methylenedioxy; nitro groups or amino groups, e.g. amino or dimethylamino.

Salts of the new compounds of this invention are particularly therapeutically useful acid addition salts, for example, those with inorganic acids, such as hydrohalic acids, e.g. hydrochloric or hydrobromic acid; or sulfuric or phosphoric acids; or those with organic acids, such as formic, acetic, propionic, glycolic, lactic, pyruvic, oxalic, malonic, succinic, maleic, fumaric, malic, tartaric, citric, ascorbic, hydroxymaleic, dihydroxymaleic, benzoic, phenylacetic, 4-aminobenzoic, 4-hydroxybenzoic, anthranilic, cinnamic, mandelic, salicylic, 4-aminosalicylic, 2-phenoxybenzoic, 2-acetoxy-benzoic, methane sulfonic, ethane sulfonic, hydroxyethane sulfonic, benzene sulfonic, p-toluene sulfonic, naphthalene sulfonic or sulfanilic acid or methionine, tryptophane, lysine or arginine.

Quaternary ammonium compounds are especially those formed with esters of hydroxylated hydrocarbons with strong inorganic or organic acids. Such esters are particularly lower alkyl halides, e.g. methyl chloride, methyl bromide, methyl iodide, ethyl chloride or propyl chloride; di-lower alkyl sulfates, e.g. dimethyl or diethyl sulfate; lower alkyl lower alkane sulfonates, e.g. methyl or ethyl methane or ethane sulfonate; or lower alkyl aryl sulfonates, e.g. methyl p-toluene sulfonate. Also included are the corresponding quaternary ammonium hydroxides and salts with inorganic or organic acids thereof.

The new compounds of this invention have antispasmodic properties without significant anticholinergic and/or antihistaminic side-effects and can be used as antispasmodic agents to relieve spasms and hypermotility of the small and large intestinal tracts, for example, in diarrhea or gastritis.

Particularly pronounced antispasmodic effects are exerted by the 5-(N,N-di-lower alkyl-amino-lower alkyl)-morphanthridine-6,11-diones and 5-(N,N-di-lower alkyl-amino-lower alkyl)-morphanthridine-6-ones, in which the lower alkyl groups have from one to seven carbon atoms, and the lower alkylene radicals, linking the tertiary amino group with the heterocyclic ring, contains from two to seven carbon atoms, and which may be unsubstituted in the aromatic rings or substituted by lower alkyl, particularly methyl; or halogen, e.g. chlorine, and the salts with inorganic acids as represented by mineral acids, or organic acids such as lower alkanoic, lower alkenoic, hydroxy-lower alkanoic, hydroxy-lower alkenoic acids or the corresponding dicarboxylic acids.

The new compounds may be formulated into medicaments in the form of pharmaceutical preparations, which contain the new compounds, salts or quaternary ammonium compounds thereof in admixture with a pharmaceutical, inorganic or organic solid or liquid carrier suitable for enteral, e.g. oral, or parenteral administration. For making up the preparations there can be employed substances which do not react with the new compounds, such as water, gelatine, lactose, starches, magnesium stearate, talc, vegetable oils, benzyl alcohols, gums, polyalkylene glycols, petroleum jelly or any other known carrier for medicaments. The pharmaceutical preparation may exist in solid form, for example, as tablets, dragees or capsules or in liquid form, for example, as solutions or emulsions. If desired, they may contain auxiliary substances, such as preserving agents, stabilizing agents, wetting or emulsifying agents, salts for varying the osmotic pressure or buffers. They may also contain, in combination, other therapeutically useful substances.

Although several processes may be anticipated for the preparation of the compounds of this invention, I prefer to prepare the new morphanthridine derivatives by reacting an N-unsubstituted morphanthridine-6,11-dione or an N-unsubstituted morphanthridine-6-one with a reactive ester formed by a tertiary amino-lower alkanol and a strong inorganic acid, and, if desired, converting a resulting salt into the free base, and/or, converting a resulting base into a salt or a quaternary ammonium compound thereof.

The starting material is preferably used in the form of a metal salt thereof, particularly an alkali metal salt, e.g. lithium, sodium or potassium salt. Such salts are prepared by reacting a morphanthridine-6,11-dione or a morphanthridine-6-one, to the nitrogen atom of which is attached a hydrogen atom, with a reagent furnishing the metal cation, for example, an alkali metal, pulverized in the presence of a high boiling hydrocarbon, e.g. toluene or xylene; an alkali metal aryl compound, e.g. lithium or sodium phenyl; an alkali metal lower alkoxide, e.g. sodium or potassium methoxide, ethoxide or butoxide; an alkali metal in the presence of ammonia; or an alkali metal amide or hydride, e.g. lithium, sodium or potassium amide or hydride. These reagents are used, according to their reactivity, in the presence of a solvent, either a non-hydroxylated solvent, such as a hydrocarbon, e.g. hexane, benzene, toluene or xylene; or an ether, e.g. p-dioxane; or a hydroxylated solvent such as a lower alkanol, e.g. methanol, ethanol or butanol. The salt is formed either under cooling, for example, when an alkali metal is used in ammonia, at room temperature or at an elevated temperature, preferably at the boiling temperature of the solvent, for example, when an alkali metal or a corresponding amide, hydride or lower alkoxide is used.

A reactive ester of a tertiary amino-lower alkanol is more especially an ester with a mineral acid, e.g. hydrochloric, hydrochromic, hydriodic or sulfuric acid. Due to the instability of certain esters they are either prepared from their salts immedaitely before they are used in the reaction or are kept in solution, for example, in a benzene, toluene or xylene solution. The reaction products are worked up according to known methods, for example, by extraction, crystallization or conversion into a salt.

The morphanthridine-6,11-diones and morphanthridine-6-ones used as the starting materials are known or may be prepared according to methods used for the preparation of the known derivatives. A method, described by Carronna et al., Gazz. Chim. Ital., vol. 83, p. 533 (1953), ref. Chemical Abstracts, vol. 49, p. 1068 (1955), consists in reacting an anthraquinone compound with hydrazolic acid using the conditions of the Schmidt Reaction. A resulting morphanthridine-6,11-dione may be reduced to the corresponding morphanthridine-6-one, for example, with catalytically activated hydrogen, e.g. hydrogen in the presence of palladium on charcoal.

The 5-tertiary amino-lower alkyl-morphanthridine-6-ones may also be prepared by reducing the corresponding 5-tertiary amino-lower alkyl-morphanthridine-6,11-diones or a salt thereof, to the desired morphanthridine-6-ones. This reduction may be carried out by hydrogenation in the presence of a catalyst, e.g. palladium on charcoal, and is preferably performed by using a solution of the starting material to be hydrogenated in a solvent, such as a lower alkanoic acid, e.g. acetic acid, or a lower alkanol, e.g. methanol or ethanol, or aqueous mixtures of such solvents.

Depending on the conditions used the new morphantridine derivatives of this invention are obtained in the form of the free bases or salts thereof. A salt may be converted into its free base the customary way, e.g. by reaction with an aqueous alkali metal hydroxide, such as lithium, sodium or potassium hydroxide, with an aqueous alkali metal carbonate, such as sodium or potassium carbonate or hydrogencarbonate; or with aqueous ammonia. A free base may be transformed into a therapeutically useful acid addition salt by reaction of the base with an appropriate inorganic or organic acid, such as, one of the acids outlined hereinabove, for example, in solution with an alcohol, e.g. methanol, ethanol, propanol or isopropanol; an ether, e.g. diethylether, or a lower alkyl lower alkanoate, e.g. ethyl acetate, or a mixture of such solvents.

The 5-tertiary amino-lower alkyl-morphanthridine derivatives of this invention may be converted into the quaternary ammonium compounds thereof by reacting a tertiary base with an ester formed by a hydroxylated lower hydrocarbon compound with a strong inorganic or organic acid. Hydroxylated lower hydrocarbon compounds contain from 1 to 7 carbon atoms and the esters thereof are more especially those with mineral acids, e.g. hydrochloric, hydrobromic, hydriodic, or sulfuric acid, or with organic sulfonic acids, e.g. p-toluene sulfonic acid. Such esters are specifically lower alkyl halides, e.g. methyl chloride, methyl bromide, methyl iodide, ethyl chloride or propyl chloride; di-lower alkyl sulfates, e.g. dimethyl or diethyl sulfate; or lower alkyl aryl sulfonates, e.g. methyl p-toluene sulfonate. The quaternizing reactions are performed in the presence or absence of a solvent, at room temperature or under cooling, at atmospheric pressure or in a closed vessel under pressure. Suitable solvents are more especially lower alkanols, e.g. methanol, ethanol, propanol, isopropanol, butanol or pentanol; lower alkanones, e.g. acetone or methyl ethyl ketone; or organic acid amides, e.g. formamide or dimethylformamide.

Resulting quaternary ammonium compounds may be converted into the corresponding quaternary ammonium hydroxides, for example, by reacting a quaternary ammonium halide with silver oxide, or a quaternary ammonium sulfate with barium hydroxide, or by treating a quaternary ammonium salts with an anion exchanger, or by electrodialysis. From a resulting base there may be formed therapeutically suitable quaternary ammonium salts by reaction with acids, for example, those outlined hereinbefore for the formation of the acid addition salts; or mono-lower alkyl sulfates, e.g. methyl or ethyl sulfate. A quaternary ammonium compound may also be converted into another quaternary ammonium salt directly without conversion into the quaternary ammonium iodide may be reacted with freshly prepared silver chloride to yield the quaternary ammonium chloride, or the quaternary ammonium iodide may be converted into the corresponding chloride by treatment with hydrochloric acid in anhydrous methanol.

The following examples are intended to illustrate the invention and are not to be construed as being limitations thereon. Temperatures are given in degrees centigrade.

*Example 1*

To a solution of 6.6 g. of morphanthridine-6,11-dione in 50 ml. of p-dioxane is given 2.13 g. of a mixture of sodium amide in xylene, containing 55% of sodium amide, and the mixture is refluxed and stirred for three hours. 32.1 ml. of a toluene solution of 2-dimethylaminopropyl chloride, corresponding to 3.9 g. of the base, is added and refluxing is continued for an additional four hours. The reaction mixture is then cooled, filtered and the solvent evaporated under reduced pressure. The residue is distilled, yielding 7.2 g. of 5-(2-dimethylaminopropyl)-morphanthridine-6,11-dione, B.P. 185°/0.2 mm. Hg.

The hydrochloride is prepared by adding a solution of anhydrous hydrogen chloride in ethyl acetate to an ether solution of 5-(2-dimethylaminopropyl)-morphanthridine-6,11-dione; the hydrochloride melts at 111–114°.

*Example 2*

To a solution of 13.38 g. of morphanthridine-6,11-dione in 100 ml. of p-dioxane is added 4.26 g. of a mixture of sodium amide in xylene, containing 55 percent of sodium amide, and the mixture is refluxed while stirring for three hours. 59 ml. of a toluene solution of 3-dimethylaminopropyl chloride, corresponding to 7.7 g. of the base, is added, and refluxing is continued for an additional seven hours. After filtration and evaporation of the solvent under reduced pressure, the residue is distilled; the 5-(3-dimethylaminopropyl)-morphanthridine-6,11-dione boils at 192°/0.1 mm. Hg and is converted into its hydrochloride according to the procedure given in Example 1, which melts at 97–102°.

*Example 3*

A solution of 6.69 g. of morphanthridine-6,11-dione in 50 ml. of dioxane is refluxed while stirring with 1.56 g. of a mineral oil suspension of sodium hydride (containing 55 percent sodium hydride) for three hours. 33 ml. of a toluene solution of 2-diethylaminoethyl chloride (1 ml. containing 0.135 g. of the 2-diethylaminoethyl chloride) is added and refluxing is continued for an additional 6 hours. After filtration the solvent is removed under reduced pressure, the residue is dissolved in ether, and the ether solution treated with anhydrous hydrogen chloride in ethyl acetate. The resulting hydrochloride salt is converted to the base by adding an aqueous sodium carbonate solution to an aqueous solution of the salt, extracting the base with ether and distilling the residue under reduced pressure after removal of the ether. 5 g. of the 5-(2-diethylaminoethyl)-morphanthridine-6,11-dione hydrochloride is obtained by treating the distillate according to the above procedure, and this hygroscopic salt is replaced by the D-tartrate as follows: 2 g. of the base is dissolved in 100 ml. of ether, a solution of 0.93 g. of D-tartaric acid in 10 ml. of isopropanol is added and the D-tartrate of 5-(2-diethylaminoethyl)-morphanthridine-6,11-dione is recrystallized from isopropanol, M.P. 90–100° (hygroscopic).

By using the procedure described in the previous example, the following N-substituted morphanthridine-6,11-dione derivatives can be prepared:

|  | M.P. |
|---|---|
| 5 - (2 - di - isopropylaminoethyl) - morphanthridine - 6,11 - dione hydrochloride | 132° (dec.) |
| 5 - (3 - diethylaminopropyl) - morphanthridine - 6,11 - dione hydrochloride | 110° (dec.) |
| 5 - (2 - diethylaminopropyl) - morphanthridine - 6,11 - dione hydrochloride | 213–215° |

Example 4

A solution of 10.45 g. of morphanthridine-6-one in 80 ml. of toluene is treated with 3.6 g. of a mixture of sodium amide in xylene, containing 55 percent of sodium amide, and the mixture is refluxed for three hours while stirring. 46.6 g. of a toluene solution of 3-dimethylaminopropyl chloride, corresponding to 6.65 g. of the base, is added and refluxing is continued for an additional 4 hours. The reaction mixture is worked up according to the procedure given in Example 1; the 5-(3-dimethylaminopropyl) - morphanthridine - 6 - one boils at 185–195°/0.8 mm. Hg, and its hydrochloride melts at 236–239° after recrystallization from isopropanol; yield: 59%.

The morphanthridine-6-one used as the starting material may be prepared as follows: A solution of 26.8 g. of morphanthridine-6,11-dione in 700 ml. of glacial acetic acid is hydrogenated in the presence of 3 g. of palladium on charcoal, containing 10 percent palladium, under a pressure of 95 pounds per square inch and at a temperature from about 60° to 80°. The reaction mixture is filtered, the filtrate concentrated under reduced pressure and ether added. The precipitating morphanthridine-6-one is filtered off and recrystallized from ethanol, M.P. 207–211°.

The following N-substituted morphanthridine-6-one derivatives are prepared according to the above-given procedure:

|  | M.P. |
|---|---|
| 5 - (2 - diethylaminoethyl) - morphanthridine - 6 - one hydrochloride | 110–130° |
| 5 - (2 - di - isopropylaminoethyl) - morphanthridine - 6 - one hydrochloride | 208–210° |
| 5 - (3 - diethylaminopropyl) - morphanthridine - 6 - one hydrochloride | 87–89° |
| 5 - (2 - diethylaminopropyl) - morphanthridine - 6 - one hydrochloride | 125° (dec.) |

By substituting in the above procedure 2-piperidino-(N)-ethyl chloride, 2-morpholino-(N)-ethyl chloride or 2-[4-methyl-piperazino-(N)]-ethyl chloride for the 3-dimethylaminopropyl chloride, the 5-[2-piperidino-(N)-ethyl]-morphanthridine-6-one, 5 - [2 - morpholino - (N)-ethyl]-morphanthridine-6-one and 5-{2-[4-methyl-piperazino-(N)]-ethyl}-morphanthridine-6-one, respectively, is obtained.

Example 5

To a solution of 4.0 g. of 5-(3-dimethylaminopropyl)-morphanthridine-6-one in 30 ml. of methanol is added 5 g. of methyl chloride, and the reaction mixture is heated for one hour to 90° in a sealed tube. The solution is concentrated and the residue recrystallized from a mixture of isopropanol and ethyl acetate to yield 3.2 g. of 5-(3-dimethylaminopropyl)-morphanthridine-6-one methochloride hydrate, M.P. 166–170°.

In a like manner can be prepared the 5-(2-diethylamino-propyl) - morphanthridine - 6 - one methochloride, M.P. 157–161°; yield: 16%.

Example 6

A total of 29.2 g. of sodium azide is gradually given to a mixture of 400 ml. of concentrated sulfuric acid and 132 ml. of methylene chloride at 10–15° while stirring until a solution is obtained. 84 g. of 2-methylanthraquinone is added at 10–25° and the reaction mixture is stirred at 30–33° for three hours. After cooling the methylene chloride layer is separated and the sulfuric acid solution poured into a mixture of ice and water. The crude product is filtered off and dissolved in toluene under reflux. On standing a crystalline material is formed, which is filtered off and recrystallized from toluene. The resulting benz-methyl-morphanthridine-6,11-dione melts at 254–256° and is designated as isomer I; yield: 19 g.

The toluene mother liquors obtained after removal of isomer I are concentrated under reduced pressure to yield a residue which is recrystallized twice from p-dioxane. The isomer II of benz-methyl-morphanthridine-6,11-dione melts at 209–213°; yield: 9.5 g.

From isomer I the following N-substituted benz-methyl-morphanthridine-6,11-diones are prepared according to the procedure described in the previous examples:

|  | M.P. |
|---|---|
| 5 - (2 - diethylaminoethyl) - benz - methyl-morphanthridine - 6,11 - dione D - tartrate (isomer I) | 135–145° |
| 5 - (2 - dimethylaminopropyl) - benz - methyl-morphanthridine - 6,11 - dione D - tartrate (isomer I) | 128–138° |
| 5 - (3 - dimethylaminopropyl) - benz - methyl-morphanthridine - 6,11 - dione D - tartrate (isomer I) | 97–110° |
| 5 - (2 - diethylaminopropyl) - benz - methyl-morphanthridine-6,11-dione hydrochloride (isomer I) | 135° (dec.) |
| 5 - (2 - di - isopropylaminoethyl) - benz-methyl-morphanthridine-6,11-dione hydrochloride (isomer I) | 125° (dec.) |
| 5 - (3 - diethylaminopropyl) - benz - methyl-morpohanthridine-6,11-dione hydrochloride (isomer I) | 143° (dec.) |

From the above-described isomer II the 5-(2-dimethylaminopropyl) - benz - methyl - morphanthridine - 6,11-dione hydrochloride (isomer II), M.P. 190–193°; yield: 49%, can be prepared according to the procedure described in detail in previous examples.

Example 7

By reducing the two isomers I and II of benz-methyl-morphanthridine-6,11-dione, described in Example 6, according to the reduction procedure described in Example 4, the benz-methyl-morphanthridine-6-one isomer I, M.P. 234–238° and the benz-methyl-morphanthridine-6-one isomer II, M.P. 176–179°, can be prepared.

From isomer I of benz-methyl-morphanthridine-6-one the following N-substituted derivatives are prepared according to the procedure shown in the previous examples:

|  | M.P. |
|---|---|
| 5 - (3 - dimethylaminopropyl)-benz-methyl-morphanthridine-6-one hydrochloride (isomer I) | 150–165° |
| 5 - (2 - diethylaminoethyl) - benz - methyl-morphanthridine-6-one hydrochloride (isomer I) | 130° (dec.) |
| 5 - (2 - diethylaminopropyl) - benz - methyl-morphanthridine-6-one hydrochloride (isomer I) | 160° (dec.) |
| 5 - (3 - diethylaminopropyl) - benz - methyl-morphanthridine-6-one hydrochloride (isomer I) | 107° (dec.) |
| 5 - (2-di-isopropylaminoethyl)-benz-methyl-morphanthridine-6-one hydrochloride (isomer I) | 145° (dec.) |

The isomer II can be converted to the 5-(3-dimethylaminopropyl)-benz-methyl-morphanthridine-6-one hydrochloride (isomer II), M.P. 140° (dec.); yield: 29%, according to previously described procedures.

By using the process described in Example 5 the 5-(2-diethylaminoethyl) - benz - methyl - morphanthridine - 6 - one (isomer I) can be converted to the corresponding methochloride, M.P. 150° (dec.); yield: 45%.

*Example 8*

A total of 29.2 g. of sodium azide is gradually given to a mixture of 400 ml. of concentrated sulfuric acid and 132 ml. of methylene chloride at 10–15° and stirring is continued until a solution is obtained. 96.8 g. of 1-chloro-anthraquinone is added at 10–25° and the reaction mixture is stirred for four hours at 30–32°. The methylene chloride layer is separated after cooling, and the sulfuric acid solution is poured into a mixture of ice and water. The crude product is filtered off, dried and extracted twice with approximately 1000 ml. of toluene under reflux. The hot toluene solution is filtered from the insoluble material.

On standing a crystalline product precipitates from the filtrate and is recrystallized from toluene to yield the benz-chloro-morphanthridine-6,11-dione, M.P. 210–214°, designated as isomer I; yield: 16 g.

The toluene mother liquors are concentrated and on standing 20 g. of a material crystallizes which is recrystallized from toluene to yield the isomer II of benz-chloro-morphanthridine-6,11-dione, M.P. 176–179°.

The toluene insoluble material, obtained in the toluene extraction of the crude reaction product, is dissolved in hot p-dioxane and on cooling, a heterogenous precipitate is formed, which is discarded. The filtrate is concentrated to yield a homogenous material, which is recrystallized from p-dioxane to give isomer III of benz-chloro-morphanthridine-6,11-dione, M.P. 257–261°; yield: 3 g.

From the three isomers I, II and III of benz-chloro-morphanthridine-6,11-dione the following N-substituted derivatives are prepared:

|  | M.P. |
|---|---|
| 5 - (2 - dimethylaminopropyl) - benz - chloro-morphanthridine-6,11-dione hydrochloride (isomer I) | 215–217° |
| 5 - (3 - dimethylaminopropyl) - benz - chloro-morphanthridine-6,11-dione hydrochloride (isomer I) | 160–170° |
| 5 - (3 - dimethylaminopropyl) - benz - chloro-morphanthridine-6,11-dione hydrochloride (isomer II) | 96–100° |
| 5 - (2 - dimethylaminopropyl) - benz - chloro-morphanthridine-6,11-dione D-tartrate (isomer II) | 85° (dec.) |
| 5 - (3 - dimethylaminopropyl) - benz - chloro-morphanthridine-6,11-dione hydrochloride (isomer III) | 120–130° |

*Example 9*

96.8 g. of 2-chloro-anthraquinone is reacted with a solution of sodium azide, concentrated sulfuric acid and methylene chloride as shown in the previous example. The crude product is filtered off, dried and extracted with approximately 4000 ml. of hot toluene. The insoluble material is separated from the hot solution by filtration.

The filtrate is cooled and the resulting crystalline material is recrystallized three times from toluene to yield isomer IV of benz-chloro-morphanthridine-6,11-dione, M.P. 221–224°; yield: 32 g.

The toluene insoluble material is dissolved in 600 ml. of p-dioxane under reflux; on cooling a crystalline material precipitates, which yields the isomer V of benz-chloro-morphanthridine-6,11-dione after three recrystallizations from p-dioxane, M.P. 302–305°; yield: 4.2 g.

The p-dioxane mother liquors, obtained after removal of isomer V, are concentrated to yield an additional 20 g. of isomer IV of benz-chloro-morphanthridine-6,11-dione, melting at 228–231° after three recrystallizations from p-dioxane. The combined crops of the isomer IV are recrystallized from toluene, M.P. 230–232°.

The following N-substituted derivatives of isomers IV and V of benz-chloro-morphanthridine-6,11-dione can be prepared:

|  | M.P. |
|---|---|
| 5 - (2 - diethylaminoethyl) - benz - chloro-morphanthridine-6,11-dione hydrochloride (isomer IV) | 150° (dec.) |
| 5 - (2 - diethylaminoethyl) - benz - chloro-morphanthridine-6,11-dione hydrochloride (isomer V) | 150° (dec.) |

By reacting a benz-methoxy-morphanthridine-6,11-dione, prepared by treating 1-methoxy-anthraquinone with hydrazoic acid as shown hereinbefore, with 2-diethylaminoethyl chloride, a 5-(2-diethylaminoethyl)-benz-methoxy-morphanthridine-6,11-dione may be prepared.

The new 5-tertiary amino-lower alkyl-morphanthridine-6,11-diones and 5-tertiary amino-lower alkyl-morphanthridine-6-ones are generally prepared by introducing into a morphanthridine-6,11-dione or a morphanthridine-6-one a tertiary amino lower alkyl radical. Such radical may be introduced by reacting a morphanthridine derivative with a reactive ester of a tertiary amino-lower alkanol with a strong inorganic or organic acid. The radical may also be formed by treating a reactive ester of a morphanthridine-6,11-dione-(N)-lower alkanol or a morphanthridine-6-one-(N)-lower alkanol with a strong acid, with a secondary amine capable of forming with the ester grouping the desired tertiary amino group. Amines to be used furnish the tertiary amino radicals mentioned hereinbefore.

Furthermore substituents substituting the benzene nuclei of one of the 5-tertiary amino-lower alkyl-morphanthridine derivatives of this invention may be introduced or converted into other substituents.

This application is a continuation in part of application S.N. 707,146, filed January 6, 1958, now abandoned.

What is claimed is:

1. A member of the group consisting of 5-tertiary amino-lower alkyl-morphanthridine-6,11-dione, 5-tertiary amino-lower alkyl-morphanthridine-6-one and these compounds substituted in one of the benzene rings condensed to the b-bond and the e-bond of the seven membered nucleus of the morphanthridine molecule by a member of the group consisting of lower alkyl, halogen, halogeno-lower alkyl, lower alkoxy, methylenedioxy, nitro, amino and dimethylamino, and tertiary amino stands for a member of the group consisting of N,N-di-lower alkyl-amino, pyrrolidino, hexamethyleneimino, morpholino, thiamorpholino and piperazino, therapeutically useful acid addition salts and lower alkyl quaternary ammonium compounds.

2. 5-(N,N-di-lower alkyl-amino-lower alkyl)-morphanthridine-6,11-dione.

3. 5-(N,N-di-lower alkyl-amino-lower alkyl)-benzlower alkyl-morphanthridine-6,11-dione.

4. 5-(N,N-di-lower alkyl-amino-lower alkyl)-benzmethyl-morphanthridine-6,11-dione.

5. 5-(N,N-di-lower alkyl-amino-lower alkyl)-benzhalogeno-morphanthridine-6,11-dione.

6. 5-(N,N-di-lower alkyl-amino-lower alkyl)-benzchloro-morphanthridine-6,11-dione.

7. 5-(N,N-di-lower alkyl-amino-lower alkyl)-morphanthridine-6-one.

8. 5-(N,N-di-lower alkyl-amino-lower alkyl)-benzlower alkyl-morphanthridine-6-one.

9. 5-(N,N-di-lower alkyl-amino-lower alkyl)-benzmethyl-morphanthridine-6-one.

10. 5-(N,N-di-lower alkyl-amino-lower alkyl)-benzhalogeno-morphanthridine-6-one.

11. 5-(N,N-di-lower alkyl-amino-lower alkyl)-benzchloro-morphanthridine-6-one.

References Cited in the file of this patent

FOREIGN PATENTS 668,659     Great Britain _____ Mar. 1954

OTHER REFERENCES

Chem. Abstracts (Abstracting Carranna et al. Gazz. Chim. Ital., vol. 83, page 533 (1953)), vol. 49, page 1068 (1955).